(12) United States Patent
Gasper et al.

(10) Patent No.: US 6,543,784 B2
(45) Date of Patent: Apr. 8, 2003

(54) WEAR COMPENSATING PLUNGER-AND-BARREL SEAL FOR HYDRAULIC FUEL INJECTORS

(75) Inventors: Mark A. Gasper, Tremont, IL (US); David M. Klingbeil, Pekin, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/740,678

(22) Filed: Dec. 19, 2000

(65) Prior Publication Data

US 2002/0074735 A1 Jun. 20, 2002

(51) Int. Cl.[7] ............................... F16J 9/20; F16J 15/32
(52) U.S. Cl. ..................... 277/438; 277/459; 277/460; 277/558; 92/168
(58) Field of Search ................. 277/436, 438, 277/439, 459, 460, 550, 558; 92/168, 240

(56) References Cited

U.S. PATENT DOCUMENTS

| | | | | |
|---|---|---|---|---|
| 159,326 A | * | 2/1875 | Hughes et al. | |
| 2,465,175 A | * | 3/1949 | Schwarz et al. | 277/562 |
| 2,678,839 A | * | 5/1954 | Richardson et al. | 277/558 |
| 2,686,402 A | * | 8/1954 | Samuel | |
| 2,691,558 A | * | 10/1954 | Smith | |
| 3,175,474 A | | 3/1965 | Eickmann | |
| 3,195,901 A | * | 7/1965 | Mercier | |
| 3,196,901 A | * | 7/1965 | Phillipps | |
| 3,421,604 A | | 1/1969 | Hobbs | |
| 3,576,153 A | * | 4/1971 | Doutt | |
| 3,657,783 A | * | 4/1972 | Eillis | 29/890.131 |
| 3,759,637 A | | 9/1973 | Vuaille | |
| 3,790,179 A | * | 2/1974 | Scannell | 277/558 |
| 3,953,213 A | * | 4/1976 | Gasper | |
| 4,013,386 A | | 3/1977 | Hardman et al. | |
| 4,211,152 A | | 7/1980 | Colletti et al. | |
| 4,386,782 A | * | 6/1983 | Reverberi | |
| 5,092,125 A | | 3/1992 | Leight-Monstevens et al. | |
| 5,169,160 A | * | 12/1992 | Gaskill et al. | |
| 5,263,404 A | | 11/1993 | Gaucher et al. | |
| 5,328,178 A | * | 7/1994 | Niles | |
| 5,495,792 A | | 3/1996 | Izumi et al. | |
| 5,682,861 A | * | 11/1997 | Stockner et al. | 123/495 |
| 5,901,686 A | | 5/1999 | Stockner et al. | |
| 5,951,022 A | * | 9/1999 | Gorman et al. | 277/626 |
| 5,992,768 A | | 11/1999 | Smith, III et al. | |

FOREIGN PATENT DOCUMENTS

| | | |
|---|---|---|
| EP | 0903490 | 3/1999 |
| EP | 1027964 | 8/2000 |

* cited by examiner

Primary Examiner—Anthony Knight
Assistant Examiner—Alison K. Pickard
(74) Attorney, Agent, or Firm—August E Roehrig, Jr.

(57) ABSTRACT

In a fuel injector having a plunger-and-barrel pumping assembly, a sealing member is mounted within an annulus of a plunger to prevent the dilution of pressurized fuel within the barrel of the tool. The sealing member includes a hollowed cavity which traps upward moving pressurized fuel and forces an extension or wiper of the sealing member upward and outward into sealing engagement with the inner surface or bore of the barrel.

19 Claims, 5 Drawing Sheets

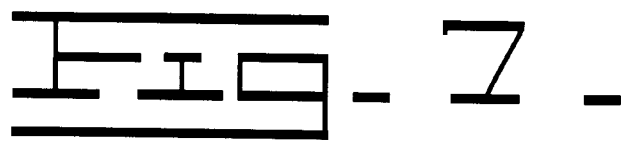
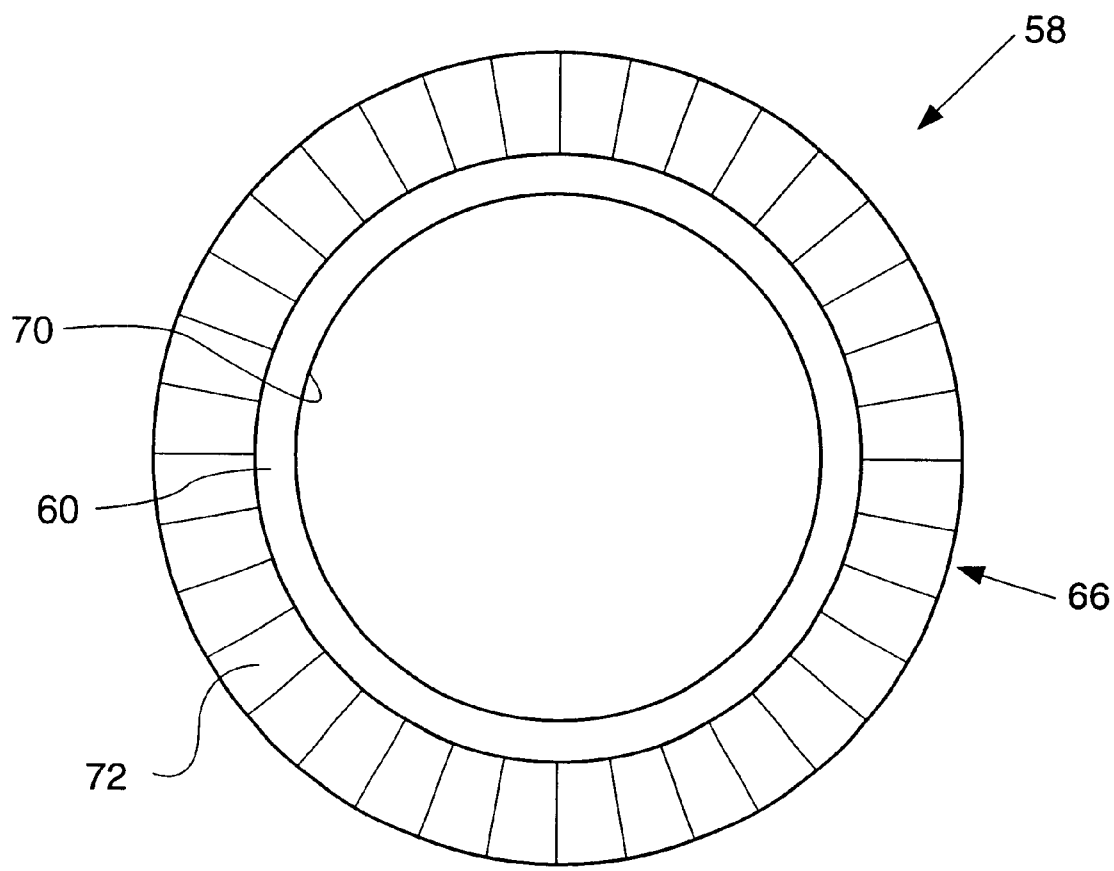

WEAR COMPENSATING PLUNGER-AND-BARREL SEAL FOR HYDRAULIC FUEL INJECTORS

TECHNICAL FIELD

The present invention relates generally to fluid seals for fuel injectors, and more particularly to a plunger seal designed to compensate for seal wear produced due to the continual reciprocation of the plunger within a barrel.

BACKGROUND ART

In one class of fuel injectors, low pressure actuation fluid, such as engine oil for example, forces a piston downward, thereby forcing a plunger to compress and expel high pressure fuel through a nozzle assembly. A spring returns the plunger through the barrel to its starting position, and the cycle begins again. Heretofore, O-rings located around an annulus or groove of the plunger were typically used to prevent the high pressure fuel within the nozzle assembly from mixing with and being diluted by the low pressure oil or other actuation fluid. For example, commonly-owned U.S. Pat. No. 5,901,686 to Stockner et al. teaches a fuel injector having a plunger slidably mounted within a plunger bore, wherein an O-ring within a groove of the plunger prevents fuel from bypassing the plunger within the bore.

Unfortunately, due to the continual reciprocation of the plunger within the barrel of injector, the O-rings would begin to wear. This would eventually lead to seepage of the fuel from the barrel, resulting in the dilution of the high pressure fuel.

The present invention is directed to overcoming one or more of the problems or disadvantages associated with the prior art.

DISCLOSURE OF THE INVENTION

In one aspect of this invention, a pumping assembly for a unit fuel injector comprises a barrel having a bore therein, the bore having a bore surface. A plunger reciprocates within the barrel and has a groove therein. A sealing member is disposed within the groove and has a deformable member. Pressurized fluids within the barrel force the deformable member of the sealing member into sealing contact with the bore surface.

In another aspect of this invention, a plunger assembly is disclosed for use in a fuel injector having a plunger-and-barrel pumping assembly in which a plunger is reciprocated within a bore in a barrel to pressurize fuel to be injected. The plunger assembly comprises a plunger having a groove therein and a sealing member disposed within the groove. The sealing member has a deformable extension adapted to contact a bore surface of a fuel injector barrel.

In still another aspect of this invention, a sealing member adapted to fit within a groove of a fuel injector plunger is disclosed. The sealing member comprises a cylindrical body having a deformable extension extending radially outwardly from the cylindrical body. The extension is configured to sealingly engage a bore surface of a fuel injector barrel and has a surface exposed to pressurized fluid within the barrel to thereby force the deformable extension against bore surface.

BRIEF DESCRIPTION OF THE DRAWINGS

FIG. 7 depicts an enlarged bottom view of the sealing member in accordance with an embodiment of the present invention.

BEST MODE FOR CARRYING OUT THE INVENTION

Figure 1:
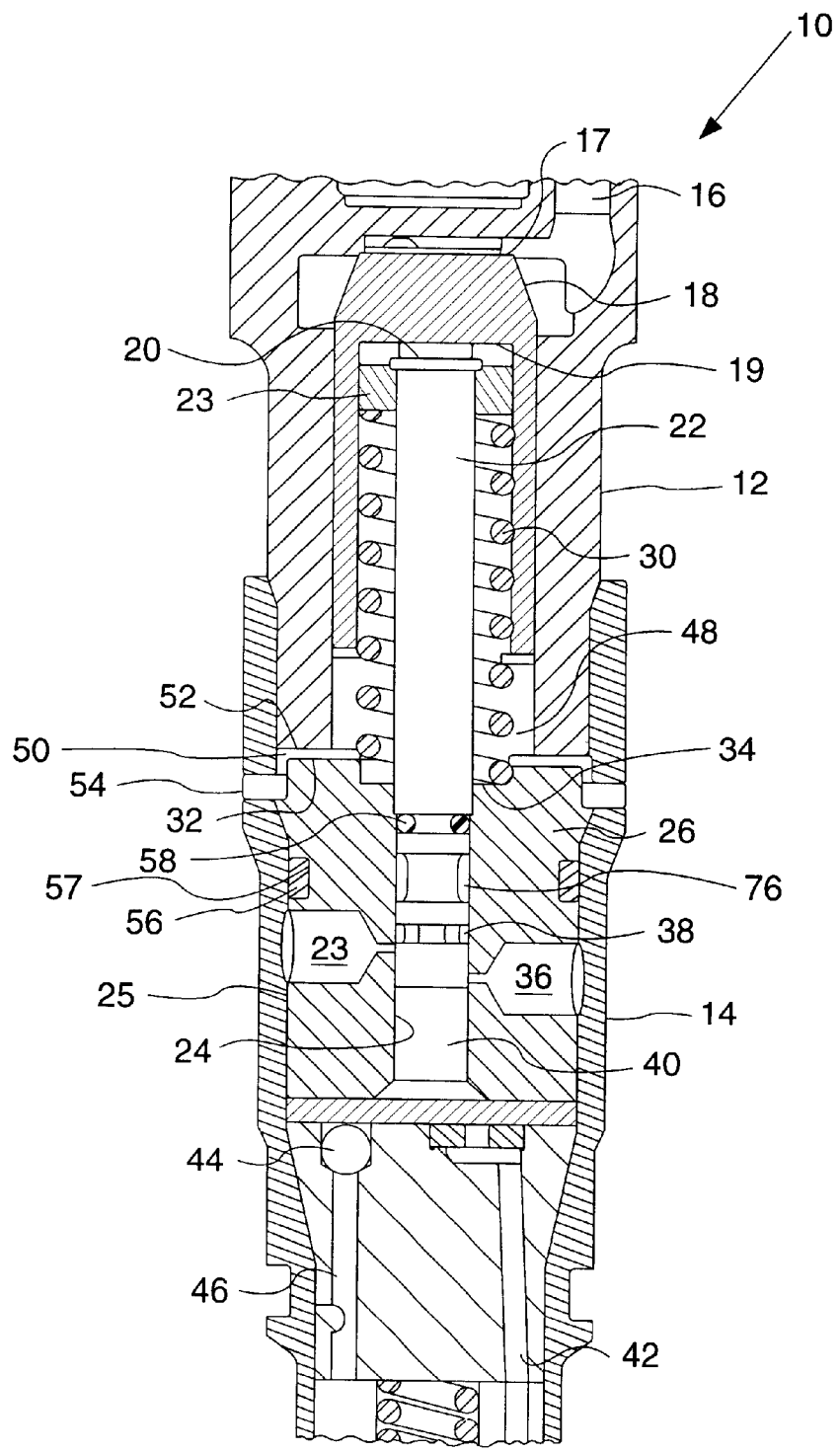
FIG. 1 depicts a cross-sectional view of a fuel injector in accordance with an embodiment of the present invention.
Figure 2:
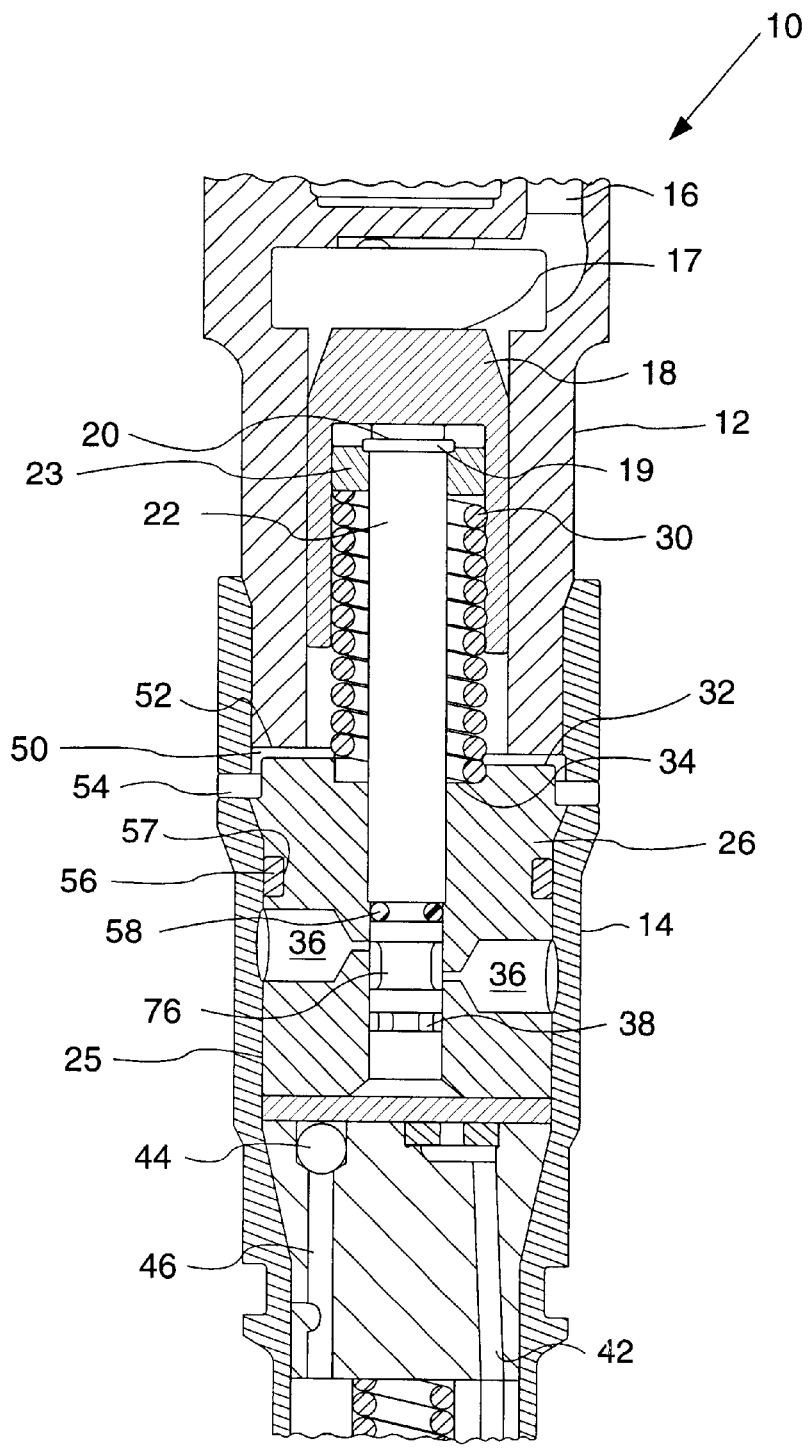
FIG. 2 depicts a cross-sectional view of the fuel injector in accordance with an embodiment of the present invention.

Referring to FIG. 1, a the pumping portion of fuel injector 10, for instance a hydraulic unit injector such as a HEUI™ injector available from Caterpillar Inc., Peoria, Ill., is shown for the purpose of explaining the advantages provided by the present invention. The fuel injector 10 generally includes an injector body 12 and a case 14, each preferably constructed of steel, or other material known and used in the art. The injector body 12 further includes an actuation fluid inlet 16, which supplies low pressure actuation fluid, such as engine oil for example, to a top surface 17 of a piston 18. The actuation fluid acts on the top surface 17 of the piston 18 to force the piston 18 downward. An engaging surface 19 of the piston 18 contacts an engaging surface 20 of a plunger 22, thereby forcing the plunger 22 downward within a bore 24 of a barrel 26, located within the case 14, as illustrated in FIG. 2.

A spring engaging element 28 of the plunger 22 compresses a spring 30 against a top surface 32 of the barrel 26. The lower end of the spring 30 is secured within spring grooves or notches 34 on the top surface 32 of the barrel 26. A pair of optional idle stability ports 36, located within the barrel 26, stabilize and maintain proper alignment of the plunger 22 within the bore 24 of the barrel 26.

As the plunger 22 descends within the bore 24 of the barrel 26, an optional prime groove or pre-injection metering device 38, within the plunger 22, operates to momentarily interrupt injection of fuel into the combustion chamber, thereby creating a so-called split injection at certain operating conditions. Fuel within the fuel chamber 40 becomes pressurized due to the downward force of the plunger 22. The specific pressure to which the fuel is raised depends upon the application, but a pressure on the order of 135 Mpa is desirable. The pressurized fuel within the fuel chamber 40 is then expelled through a fuel passage 42, and out the end of the nozzle assembly (not shown), as known in the art. An inlet check valve 44 prevent pressurized fuel from entering the inlet passage 46 during downward travel of the plunger 22.

Here it is important to note that this invention is described thus far in the context of a hydraulic unit injector having a traditional spring-biased, indirectly operated check valve (not shown). However, those skilled in the art will recognize that this invention is equally applicable to unit injectors that utilize directly operated injection check valves, either through hydraulic means or otherwise.

After the downward stroke of the plunger 22 is complete, the spring 30 then urges the plunger 22 upward, returning the plunger 22 and the piston 18 to the starting position, as depicted in FIG. 1. As the spring 30, plunger 22 and piston 18 begin to ascend, excess oil or other actuation fluid within a body chamber 48 exits the injector body 12 through actuation fluid outlet grooves 50, positioned between a base surface 52 of the injector body 12 and the top surface 32 of the barrel 26. The grooves 50 are connected to vents 54, which lead to oil rails (not shown) within the injector 10. The excess oil or other actuation fluid is then recycled back into the engine (not shown) for reuse. Similarly, excess pressurized fuel within the case 14 and nozzle assembly enter fuel rails (not shown) within the nozzle assembly, and are recycled as known in the art.

Figure 3:
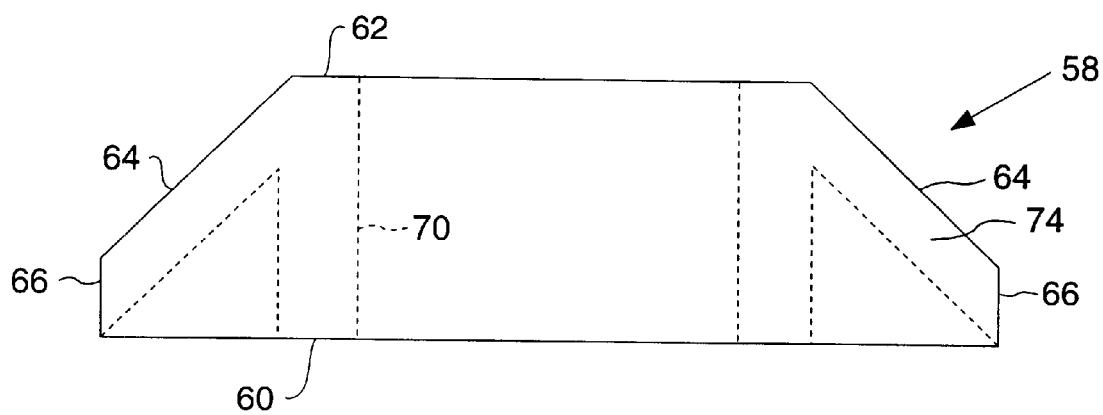
FIG. 3 depicts an enlarged side view of a sealing member in accordance with an embodiment of the present invention.
Figure 4:
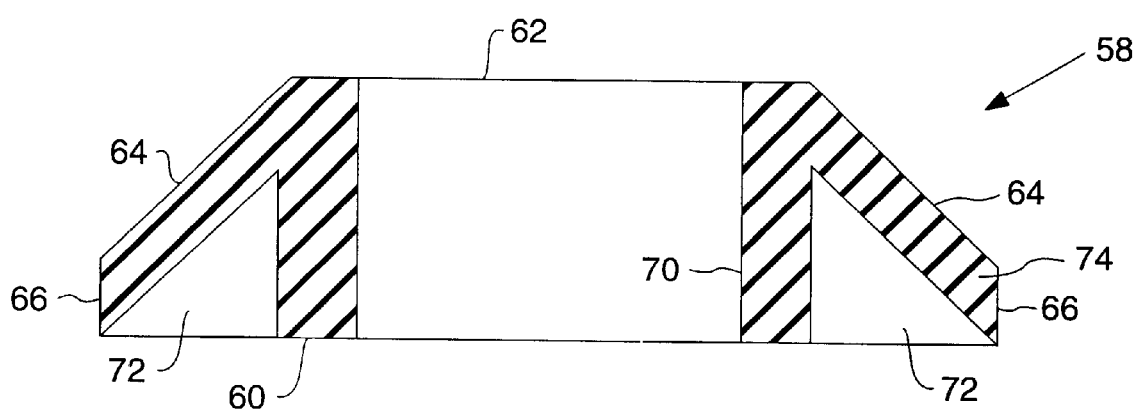
FIG. 4 depicts an enlarged cross-sectional view of the sealing member in accordance with an embodiment of the present invention.
Figure 5:
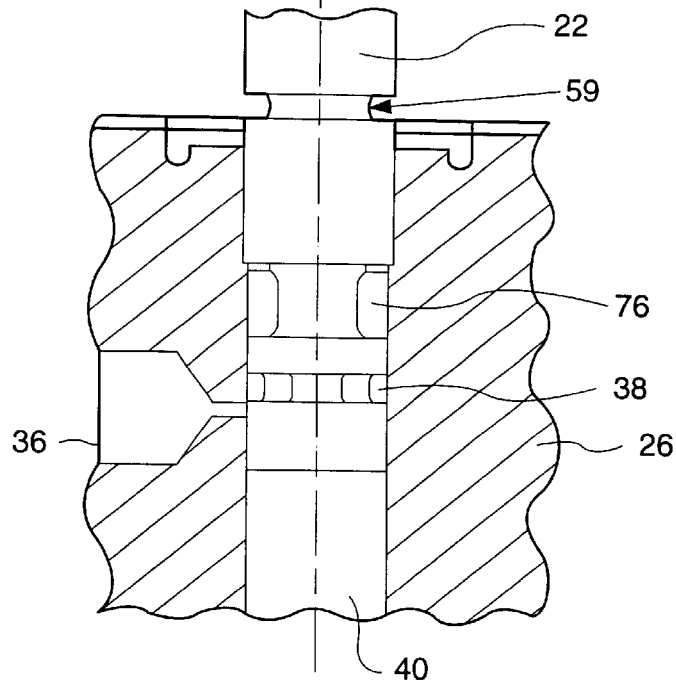
FIG. 5 depicts an enlarged cross-sectional view of the fuel injector plunger in accordance with an embodiment of the present invention.

A stationary sealing member 56, preferably an O-ring, or other known sealing device, is seated within an annulus or groove 57 formed within the outer surface 25 of the barrel 26. A plunger sealing member 58 is seated within an annulus or groove 59 of the plunger 22 (refer to FIGS. 5 and 6). The plunger sealing member 58, shown in more detail in FIGS. 3, 4 and 7, is preferably composed of a deformable material, such as a 90 durometer Vitono (DuPont Dow Elastomers LLC, Wilmington, Del.) material or other suitable fluoroelastomer However, other materials may be used, e.g., rubber, plastic, teflon coated copolymer of butadiene and acrylonitrile (Buna N), etc., provided the material is capable of withstanding the high temperatures that exist within the fuel injection injector 10 during operation. One skilled in the art will recognize that such temperatures are generally equal to the cooling or oil temperatures of the engine and are typically at least 100° C. and sometimes on the order of 120° C. to 140° C. The plunger sealing member 58 is preferably a molded one-piece member, however, other designs contemplated by those skilled in the art are also possible. The plunger sealing member 58 includes a base 60, a top 62 and sides 64 and 66. The base 60 and an inner surface 70 of the plunger sealing member 58 elastically conform to and fit within the annulus 68 of the plunger 22.

Figure 6:
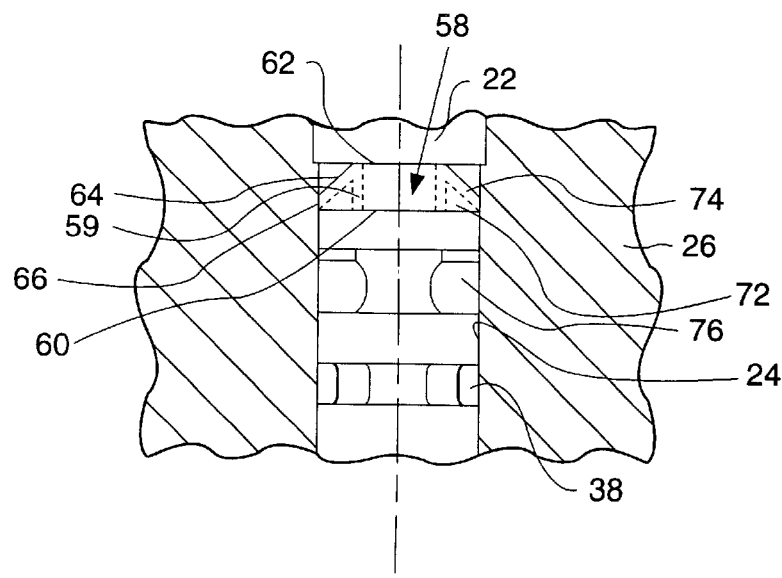
FIG. 6 depicts an enlarged cross-sectional view of the plunger and the sealing member in accordance with an embodiment of the present invention.

FIGS. 4 and 7 illustrate the plungers sealing member 58 in more detail. FIG. 4 shows a cross sectional view, and FIG. 7 shows a bottom view of the plunger sealing member 58. In particular, a cavity 72, illustrated by the shaded region in FIG. 7, exists between the base 60 and the sides 64, 66. The cavity 72 extends radially around the base 60 of the plunger sealing member 58. An extension or wiper 74 is formed around the circumference of the plunger sealing member 58, due to the existence of the cavity 72, wherein the sides 64, 66 form a first and second side of the wiper 74, respectively. The second side 66 of the wiper 74 frictionally engages the bore 24 of the barrel 26, as illustrated in FIG. 6, thereby preventing the de-pressurization of the fuel within the case 14. As shown, extension 72 is preferably radially longer than a width of the engagement wear surface of side 66.

The cavity 72 is designed to assist the plunger sealing member 58 in preventing the pressurized fuel within the case 14 from escaping into the actuation fluid chamber 48, or out the actuation fluid outlet grooves 50. In particular, the cavity 72 traps the high pressure fuel traveling along the surface of the bore 24 that has escaped from the fuel chamber 40 of the barrel 26, thereby forcing the wiper 74 upward. This in turn forces the second side 66 of the wiper 74 into closer contact with the bore 24 of the barrel 26. In this manner, the plunger sealing member 58 maintains an unbiased seal with the barrel 26, even as the surface of the second side 66 of the plunger sealing member 58 begins to wear due to the frictional engagement with the bore 24 of the barrel 26. This prevents the fuel within the fuel chamber 40 of the barrel 26 from being diluted. Otherwise, without the cavity 72 the second side 66 of the plunger sealing member 58 would begin to wear, thereby compromising the frictional engagement between the plunger sealing member 58 and the bore 24. This could eventually allow pressurized fuel to pass into the actuation fluid chamber 48, or out the actuation fluid outlet grooves 50 and vents 54.

The cavity 72, as best illustrated in FIG. 4, has a wedge or triangular shape. However, this configuration is only meant as an example. The cavity 72 may be formed in many other shapes and sizes, as contemplated by those skilled in the art.

A pressure accumulation annulus 76 is also machined within the plunger 22, as shown in FIGS. 1, 2, 5 and 6. The pressure accumulation annulus 76 further aids the plunger sealing member 58 by reducing the amount of frictional wear experienced by the second side 66 of the plunger sealing member 58. In particular, the pressure accumulation annulus 76 collects a portion of the pressurized fuel traveling upward along the surface of the bore 24, thereby reducing the amount of pressurized fuel acting against the plunger sealing member 58. Those skilled in the art will appreciate that the larger the pressure accumulation annulus 76, the less pressure exerted on the plunger sealing member 58, and in turn, the less frictional wear experienced by the second side 66 of the plunger sealing member 58. It should also be noted that by reducing the fuel pressure within the cavity 72 of the plunger sealing member 58, the pressure accumulation annulus 76 prevents the second side 66 of the wiper 74 from experiencing too much frictional engagement, which could eventually lead to additional wear.

INDUSTRIAL APPLICABILITY

Those skilled in the art will appreciate that the plunger sealing member 58 described above is intended to increase the working life of the fuel injection injector 10 by maintaining a tight seal between the plunger 22 and the barrel 26. The present invention is designed to increase the time interval between the replacement of worn sealing members. In particular, the plunger sealing member 58 that will continually maintain a tight seal between the plunger 22 and the barrel 26, regardless of the wear experienced at the side 66 of the sealing member 58 due to its frictional engagement with the bore 24 of the barrel 26, is provided. The plunger sealing member 58 includes the deformable extension or wiper 74, which extends outwardly around the perimeter of the plunger sealing member 58, which frictionally engages the bore 24 of the barrel 26.

The frictional engagement between the second side 66 of the plunger sealing member 58 is further aided by the cavity 72 formed within the bottom of the plunger sealing member 58, beneath the wiper 74. The cavity 72 is designed to utilizes the upward force exerted by the pressurized fuel within the fuel chamber 40, to force the second side 66 of the plunger sealing member 58 against the bore 24, thereby forming an even tighter seal with the bore 24. This is particularly useful as the second side 66 of the plunger sealing member 58 begins to wear. Therefore, regardless of the wear experienced by the plunger sealing member 58, the second side 66 of the plunger sealing member 58 is continually being urged against the bore 24 of the barrel 26, thereby ensuring a tight seal.

In operation, after the plunger 22 and the piston 18 have reached the uppermost position, as illustrated in FIG. 1, the cycle begins again. The plunger 22 continually reciprocates within the bore 24 of the barrel 26, thereby continually expelling pressurized fuel out the end of the nozzle assembly, as desired. The stationary sealing member 56 and the plunger sealing member 58 prevent the pressurized fuel within the fuel chamber 40 from entering the body chamber 48, and mixing with the oil or other actuation fluid therein. The stationary sealing member 56 also prevents pressurized fuel within the case 14 that seeps along the outer surface 25 of the barrel 26 from entering the body chamber 48.

It should be appreciated by those skilled in the art that the present invention is not limited by the use disclosed herein. Rather, the sealing member of the present invention could be used to seal other cylindrical members, such as hydraulic valves, and so on.

Other aspects and features of the present invention can be obtained from a study of the drawings, the disclosure, and the appended claims.

What is claimed is:

1. A pumping assembly for a unit fuel injector, comprising:
   a barrel having a bore therein, said bore having a bore surface;
   a plunger which reciprocates within the barrel, said plunger have a groove therein; and
   a sealing member including a cylindrical body having a deformable extension extending radially outwardly from said cylindrical body, said extension terminating in a cylindrical engagement wear surface to sealingly engage said bore surface of said barrel and having a surface exposed to pressurized fluid within said barrel to thereby force said engagement wear surface of the deformable extension against said bore surface.

2. The pumping assembly of claim 1, wherein the sealing member includes a cavity that traps pressurized fluids from within the barrel and pushes the deformable extension against the bore.

3. The pumping assembly of claim 1, wherein the sealing member is formed at least in part by a deformable material.

4. The pumping assembly of claim 3, wherein the deformable material comprises a fluoroelastomer material.

5. The pumping assembly of claim 3, wherein the deformable material comprises a copolymer of butadiene and acrylonitrile.

6. The pumping assembly of claim 1, wherein the sealing member is a one-piece member.

7. The pumping assembly of claim 1, including a spring which biases the plunger toward a starting position.

8. The pumping assembly of claim 1, including a piston engaged with said plunger to forces the plunger downward through the barrel in response to application of fluid pressure to said piston.

9. The pumping assembly of claim 1, including a pressure accumulation annulus which reduces the amount of pressurized fuel acting on the sealing member.

10. The pumping assembly of claim 1 wherein said extension is radially longer than a width of said engagement wear surface.

11. A plunger assembly for use in a fuel injector having a plunger-and-barrel pumping assembly in which a plunger is reciprocated within a bore in a barrel to pressurize fuel to be injected, comprising:
    a plunger having a groove therein; and
    a scaling member disposed win the groove, said scaling member including a cylindrical body having a deformable extention extending radially outwardly from said cylindrical body, said extension terminating in a cylindrical engagement wear surface to sealingly engage a bore surface of a fuel injector barrel, and having a surface exposed to pressurized fluid within said barrel to thereby force said engagement wear surface of the deformable extension against said bore surface.

12. The plunger assembly of claim 11, wherein the sealing member includes a cavity around the perimeter of the sealing member.

13. The plunger assembly of claim 11, wherein the sealing member is formed from a deformable material.

14. The plunger assembly of claim 11, wherein the sealing member is a one-piece member.

15. The plunger assembly of claim 11, wherein the sealing member is a molded piece.

16. The plunger assembly of claim 11 wherein said deformable extension is radially longer than a width of said engagement wear surface.

17. A sealing member, adapted to fit within a groove of a plunger of a pumping assembly, comprising:
    a cylindrical body having a deformable extension extending radially outwardly from said cylindrical body, said extension terminating in a cylindrical engagement wear surface to sealingly engage a bore surface of a fuel injector barrel and having a surface exposed to pressurized fluid within the barrel to thereby force the engagement wear surface of the deformable extension against bore surface.

18. The sealing member of claim 17, wherein the sealing member is a one-piece member.

19. The sealing member of claim 17 wherein said extension is radially longer than a width of said engagement wear surface.

* * * * *